2,808,347
Patented Oct. 1, 1957

2,808,347

COATED POLYMERIC THERMOPLASTIC DIELECTRIC FILM AND METHOD FOR PRODUCING SAME

Philip Strubing Blatz, Buffalo, N. Y., assignor to E. I. du Pont de Nemours and Company, Wilmington, Del., a corporation of Delaware No Drawing. Application April 23, 1954,
Serial No. 425,330

6 Claims. (Cl. 117—138.8)

This invention relates to a process of improving the dielectric life of polymeric thermoplastic materials useful as electrical insulation, and, more particularly, to a polyethylene terephthalate film having an increased dielectric life.

The production of the novel class of fiber- and film-forming linear polyesters of terephthalic acid and a glycol of the series $HO(CH_2)_nOH$ where "$n$" is an integer from 2–10, inclusive, is fully disclosed in United States Patent 2,465,319 to Whinfield and Dickson. From a commercial standpoint, one of the most attractive polymers of this class is polyethylene terephthalate.

Polyethylene terephthalate film, particularly oriented film (film which has been sretched and/or rolled in two directions) and heat-set at elevated temperatures (within the range from 150° to 250° C.) has been found to possess a unique combination of electrical, physical, and chemical properties which make it outstanding for use as a dielectric. This is particularly true of polyethylene terephthalate film which has been stretched and/or rolled to substantially the same degree in both directions, e. g., 3X, where X equals the original dimension of the film, to obtain a substantially "balanced" film, which means that the physical properties of the film as measured in both directions are substantially the same. The oriented, heat-set, polyethylene terephthalate film is outstanding as a dielectric because it retains a considerable percentage of its electrical properties, strength, and durability at elevated operating temperatures. Consequently, the film is particularly outstanding for use as a dielectric in capacitors, motors, generators, transformers, etc., at not only moderate operating temperatures, but also at ambient temperatures approaching 150°–175° C.

In extending the usefulness of polyethylene terephthalate and like thermoplastic polymeric film dielectric to a wider variety of electrical end uses, it became apparent that the dielectric life of the film required improvement, particularly for use in equipment subjected to high voltage stresses. As employed herein, the term "dielectric life" of the polymeric thermoplastic film applies to the actual time that a particular film may be subjected to a particular voltage stress under conditions of corona discharge before actual physical breakdown, i. e., rupture, of the film dielectric.

It is the action upon the polymeric film dielectric of corona discharge (in air or other gaseous medium) which causes actual physical breakdown of the film under conditions of a particular voltage stress (a potential difference large enough to produce a visible discharge but not large enough to produce instantaneous breakdown). Obviously, the lower the voltage stress, the longer the dielectric life of the film. "Corona discharge" is defined as the discharge of electricity which appears upon the surface of a conductor when the potential gradient exceeds a certain value. For example, when a continuous potential applied to a pair of narrow wires is slowly increased, the voltage will be reached at which a hissing noise is heard and a pale violet light is visible (in the dark) around the wires. This voltage is defined as the "critical visual corona point." Corona is due to ionization of the air or surrounding gases (it does not occur in a vacuum). That is, the air in the ionized region is conducting, and this results in increasing the effective diameter of the conductor. For example, even though a film dielectric is wound tightly around a wire, air is not entirely excluded from the space between the conductor and the film dielectric; and it is the air or other gaseous medium which is ionized. The corona envelopes a conductor as a concentric cylinder, and the outside diameter becomes such that the gradient at that point decreases to the rupturing point of the air. Beyond this point, the corona cannot increase for the constant applied voltage because the gradient decreases with increasing radial distance from the wire. The glow or breakdown of the surrounding air starts first at the point of maximum gradient, or at the conductor surface. It is the bombardment of the dielectric film with ions or electrons that actually results initially in roughening or pitting the surface of the film. As the bombardment continues, the film eventually ruptures; and, hence, this causes short circuits owing to the physical failure.

An object of the present invention is to provide a polymeric thermoplastic dielectric film having increased dielectric life. A further object is to provide a polyethylene terephthalate film dielectric having increased dielectric life. A further object is to provide a process of improving the dielectric life of polymeric thermoplastic dielectric compositions, particularly polyethylene terephthalate film. Other objects will be apparent from the following description of the invention.

These objects are realized in accordance with the present invention which, briefly stated, comprises providing a dielectric base film of thermoplastic polymeric material, e. g., polyethylene terephthalate, with an adherent coating comprising essentially a vulcanized chlorosulfonated olefin polymer, e. g., chlorosulfonated polyethylene, and uniformly distributed, finely divided particles of an amorphous silica.

The present invention will be further described specifically with respect to improving the dielectric life of polyethylene terephthalate film, but it should be understood that the invention is applicable as well to enhancing the dielectric life of other types of polymeric thermoplastic films useful as dielectrics, such as films of polyethylene, polytetrafluoroethylene, polystyrene, etc.

The preferred chlorosulfonated olefin polymer constituent of the coating composition of this invention is chlorosulfonated polyethylene which is a chlorosulfonated product of a normally solid polymer of ethylene. The polymer may be prepared by known techniques, and particularly, by the process described in United States Patent No. 2,212,786 to D. M. McQueen. Other chlorosulfonated olefin polymers may be employed, including the chlorosulfonated polypropylene and chlorosulfonated polyisobutylene. In general in accordance with the teachings of McQueen, the solid ethylene polymer is reacted with chlorine and sulfur dioxide substantially simultaneously to prepare a vulcanizable chlorosulfonated solid polymer of ethylene containing the following structural unit attached to the linear polyethylene chains: $—SO_nCl_m$ where "$n$" is 1 to 3 and "$m$" is 1 to 2. Normally, the chlorosulfonated ethylene polymers are obtained in the form of a fluff or in the form of a solution of the polymer in solvents such as toluene, xylene, benzene and carbon tetrachloride.

The vulcanizable chlorosulfonated polyethylene prepared in accordance with the McQueen patent, or, more specifically, those vulcanizable polymers described by McAlevy in United States Patent No. 2,586,363, may be vulcanized or cured by following the techniques and employing the agents and accelerators described by McAlevy, Strain and Chance in United States Patents Nos. 2,416,060 and 2,416,061. In brief, these patents described the curing operation as most efficiently conducted by compounding the chlorosulfonated polyethylene with a vulcanization mix containing an oxide of a polyvalent metal. Specifically, the metal oxide is litharge, and the vulcanization mix also contains a weak monobasic or polybasic acid of high molecular weight, such as stearic acid or rosin. Furthermore, small amounts of antioxidants and/or vulcanization accelerators may also be employed such as diphenyl guanidine, mercaptobenzothiazole, phenyl beta naphthyl amine, or high molecular weight phenolic compounds. The quantities of these preferred agents which give best results in the coating composition are, per 100 parts of chlorosulfonated polyethylene: oxide of di- or polyvalent metal, 2 to 60 parts, preferably 10–20 parts and with litharge especially 30 to 60 parts; rosin, or equivalent, 0 to 30 parts, preferably 5 to 10 parts; antioxidant, 0 to 3 parts, preferably 0.5 to 2.0 parts; and accelerator, 0 to 8 parts, preferably 1 to 5 parts. Obviously, in place of the agents listed above, any type of vulcanization accelerator and/or promoter may be employed provided that the ultimate electrical, physical and chemical properties of the coated dielectric film are not adversely affected.

In addition to compounding the chlorosulfonated polyethylene, prior to the coating step, with necessary vulcanization accelerators and antioxidants, it is normally necessary to stabilize the polymer against degradation or decomposition by heat and/or light by the addition of suitable stabilizing agents such as phenyl glycidyl ether described by Brooks and Smook in United States Patent No. 2,658,883. Varying quantities of such stabilizing agents may be employed depending upon the end use of the coated polyethylene terephthalate film dielectric, that is, depending upon the atmosphere and elevated temperatures to which the dielectric will be exposed in various types of electrical apparatus.

In general, finely divided particles of an amorphous silica having ultimate particles, either in the form of supercolloidal aggregates or individual particles, with an average greatest dimension ranging between 5 millimicrons and 10 microns are preferred. Commercially available types of amorphous silicas useful for purposes of this invention may be arbitrarily divided into five classification: aerogel, precipitated, vapor phase, diatomaceous and chemically modified types. "Santocel" CS, manufactured by the Monsanto Chemical Co., is an example of the aerogel type. This is slightly acidic and contains small amounts of alcohol, water, and sodium sulfate as the chief impurities. The particle diameter is approximately 30 millimicrons, with a surface area of approximately 110–150 m.²/gm. The precipitated silicas may be represented by "Hi-Cil" X303 or "Hi-Sil" XW, manufactured by the Columbia-Southern Chemical Corporation. This material has an average particle diameter of 20–25 millimicrons and a surface area within the range of 140–160 m.²/gm. A typical representative of the vapor-phase type of silica is "Aerosil," manufactured by Godfrey L. Cabot, Inc., this material having an average particle diameter approximately 15–20 millimicrons and a surface area of 175–200 m.²/gm. The diatomaceous types of silicas may be further subdivided into two groups which are important in compounding the present coating compositions. These are the heat calcined and fluxed calcined materials. Both are relatively free from organic contaminants and have no adverse effect upon vulcanizing systems usually employed. Particle sizes are much larger than those of the silicas mentioned above, ranging from 1 to 6 microns. The surface areas are larger than would be calculated from particle diameter owing to high internal area in this form of silica. In the heat calcined group are such products as "Celite" 270, manufactured by Johns-Manville Corporation, and "Dicalite" PS, manufactured by Great Lakes Carbon Corporation. In the flux calcined group are "Dicalite" White, and "Celite" super floss. Representative of the chemically modified silicas, and preferred as the amorphous silica component of the coating compositions of this invention is the type known as "estersil." This type of silica is fully described in United States Patent No. 2,657,149 to Ralph K. Iler. In brief, the estersils are esterified supercolloidal substrates, that is, substrate in the form of particles coated with —OR groups, the substrate having a surface of silica and having a specific surface area of at least 1 m.²/gm., the coating of —OR groups being chemically bound to said silica and R being a hydrocarbon radical of at least 2 carbon atoms wherein the carbon atom attached to oxygen is also attached to hydrogen. In general, these chemically modified silicas have a specific surface area of at least 1 m.²/gm. and usually within the range from 1–900 m.²/gm.

In compounding the present compositions, the amount of amorphous silica should fall within the range from 5%–60% by weight of the total solids in the composition. On the other hand, the amount of chlorosulfonated polyethylene should be within the range from 40%–90%, by weight of the total solids in the coating composition.

The present coating compositions may conveniently be applied in conventional fashion to the dielectric film substrate or base film from solutions of the chlorosulfonated olefin polymer, e. g., chlorosulfonated polyethylene, in a volatile organic solvent medium, the particulate silica component being in suspended form; or the coating may be applied from dispersions of the polymer and silica in water. Thus, in compounding and preparing the present coating compositions for application to the base dielectric film, a suitable quantity of the chlorosulfonated polyethylene, commercially available in fluff form, may be added to the selected solvent, preferably toluene or xylene, to form a solution. Other readily available solvents which may be used include benzene and carbon tetrachloride. In step-wise fashion, the essential vulcanization promoters and/or accelerators, antioxidants, and stabilizers may be added, and, finally, the amorphous silica in particle form. The mixture of materials is agitated with the solvent medium, and the insoluble components, e. g., amorphous silica particles, are uniformly suspended in the solvent.

The coating composition, prepared as described, is applied to one or both surfaces of the base film by any desired expedient; and the coated film is thereafter treated at room temperature or moderately elevated temperature to remove solvent and then at a more elevated temperature, e. g., about 150° C., for about 15–30 minutes, to cure the chlorosulfonated polymer.

It may be necessary, depending upon the end use for the coated dielectric films of the present invention, to apply a subcoating composition to the base dielectric film, e. g., oriented, heat-set, polyethylene terephthalate film, to improve adhesion between the base film and the chlorosulfonated polyethylene/silica coating. When applying the subject coating compositions to polyethylene terephthalate film, it is preferred to apply a subcoating which is chemically similar to the base film. Any suitable subcoatings may be employed provided that they improve the adhesion between base film and the present coatings and do not materially adversely affect the original combination of physical, electrical and chemical properties of the base film. Preferred subcoatings include copolyesters derived by reacting glycol, terephthalic acid or low alkyl ester thereof with a second acid or low alkyl ester thereof from the group consisting of sebacic acid, isophthalic acid, and hexahydroterephthalic acid. Normally, in preparing suitable subcoatings, it is preferred that the subcoating composition contain at least 50% of the terephthalic acid component, based upon the total weight of acid components. The subcoating compositions may be applied to the base dielectric film from solvent solutions, or homogeneous thin films of the copolyester compositions may be first applied to the dielectric base film by lamination under heat and moderate pressure.

The following example of a preferred embodiment further illustrates the principles and practice of my invention. Parts are by weight.

EXAMPLE

The following formulation:

| | Parts |
|---|---|
| Chlorosulfonated polyethylene | 20 |
| Litharge | 8 |
| Hydrogenated wood rosin | 0.5 |
| Mercaptobenzothiazole | 0.2 |
| Chemically modified silica (USP 2,657,149) | 10 |
| Solvent (carbon tetrachloride) | 200 | was prepared in the manner above described, the materials being added to the solvent at room temperature. The mixture was transferred into a container partially filled with glass beads, and the container was agitated on a rolling mill for 24 hours. Oriented (stretched 3× in both directions), heat-set (at a temperature of about 200° C.) polyethylene terephthalate film was employed as the base film dielectric. The base film (1 mil in thickness) was first coated with a thin subcoating (less than 1gm./m.²) of a copolyester of ethylene terephthalate/ethylene sebacate (60/40*) from a solvent (chloroform) solution, and the solvent was permitted to evaporate at room temperature. The subcoated film was then passed through a solution of the chlorosulfonated polyethylene/silica composition and then between doctor rods to remove excess coating composition. The coating was dried at room temperature for 1 hour. Thereafter, the coating was cured or vulcanized at 150° C. for 15–30 minutes.. The resulting coated film was subjected to the following test for dielectric life along with a control sample of uncoated polyethylene terephthalate film of the same specifications as the base dielectric film.

*Dielectric life test*

The film sample to be tested was pressed on a brass plate to which the high voltage was to be applied. A brass rod (6" long and ¼" in diameter) was placed on top of the film sample and normal to the brass plate (the film sample was sandwiched between the brass plate and an end of the brass rod). The rod served as the ground electrode. The end of the rod touching the film sample was rounded off at a radius of curvature of 1/16". The pressure exerted on the film was due only to the gravitational forces on the rod. The entire test apparatus was set up in air. Sufficient voltage was applied to the plate to give a voltage stress of 1,000 volts per mil across the sample. Failure of the sample was indicated by a rapid increase in the flow of current between the brass plate and the brass rod. At the moment current flowed, an arc was struck between the electrodes, the arc passing through the hole in the film caused by the failure. The abrupt increase in the flow of current was used to trip a relay giving a record of the failure. Ten samples were treated simultaneously. The time to the failure of the fifth sample was used as a measure of the dielectric life (under corona conditions) of the material tested.

The following table, Table I, indicates the time required for the fifth sample out of ten to fail under the specified voltage stress, and the weight of the present coating composition applied to the polyethylene terephthalate base film. In addition, the same information is recorded for uncoated polyethylene terephthalate film of the same type as the base dielectric film of the coated samples.

*Reaction product of glycol and 60 parts dimethyl terephthalate and 40 parts dimethyl sebacate.

TABLE I

| Example | Base Dielectric Film | Coating Weight (gms./sq. meter) | Time to Fifth Failure of Ten Samples (hours) | Voltage Stress (volts/mil) |
|---|---|---|---|---|
| Control A | Polyethylene terephthalate (stretched 3× in both directions and heat-set at 200° C.— 1 mil). | None | 8.2 | 1,023 |
| Control B | (Same as Control A) | None | 11.3 | 983 |
| 1 | (Same as Control A) | 16.0 | 28.3 | 1,116 |

From the foregoing, it is apparent that a polyethylene terephthalate film, for example, and preferably one which has been oriented and heat-set, when coated with the present coating compositions, has a dielectric life which is several fold greater than the uncoated polyethylene terephthalate film at voltage stresses in the neighborhood of 1,000 volts per mil, and an even longer dielectric life at lower voltage stresses.

I claim:
1. Balanced, biaxially oriented, heat-set polyethylene terephthalate base film having a continuous coating consisting of 20 parts by weight of chlorosulfonated polyethylene, 8 parts of litharge, 0.5 part of hydrogenated wood rosin, 0.2 part of mercaptobenzothiazole, and 10 parts of an estersil comprised of a supercolloidal substrate having a surface of silica coated with —OR groups chemically bonded to the silica, R being a hydrocarbon radical of from 2 to 18 carbon atoms wherein the carbon atom attached to oxygen is also attached by hydrogen.

2. Balanced, biaxially oriented, heat-set, polyethylene terephthalate base film having a continuous subcoating consisting of a copolyester of glycol, terephthalic acid and an acid from the group consisting of sebacic acid, isophthalic acid, and hexahydroterephthalic acid, said polyester containing at least 50% by weight of terephthalic acid, and having a top coating consisting of 20 parts by weight of chlorosulfonated polyethylene, 8 parts of litharge, 0.5 part of hydrogenated wood rosin, 0.2 part of mercaptobenzothiazole, and 10 parts of an estersil comprised of a supercolloidal substrate having a surface of silica coated with —OR groups chemically bonded to the silica, R being a hydrocarbon radical of from 2 to 18 carbon atoms wherein the carbon atom attached to oxygen is also attached by hydrogen.

3. The process which comprises coating a balanced, biaxially oriented, heat-set polyethylene terephthalate base film with a coating composition consisting of 20 parts by weight of chlorosulfonated polyethylene, 8 parts of litharge, 0.5 part of hydrogenated wood rosin, 0.2 part of mercaptobenzothiazole, 10 parts of an estersil comprised of a supercolloidal substrate having a surface of silica coated with —OR groups chemically bonded to the silica, R being a hydrocarbon radical of from 2 to 18 carbon atoms wherein the carbon atom attached to oxygen is also attached by hydrogen and 200 parts of carbon tetrachloride to form a continuous coating on the film, drying the coated film and thereafter heating said coated film at a temperature of about 150° C., for from about 15–30 minutes to cure said chlorosulfonated polyethylene.

4. The process which comprises coating a balanced, biaxially oriented, heat-set polyethylene terephthalate base film with a subcoating composition consisting of a volatile organic solvent solution of a polyester of glycol, terephthalic acid and an acid from the group consisting of sebacic acid, isophthalic acid, and hexahydroterephthalic acid, said polyester containing at least 50% by weight of terephthalic acid, drying to form a subcoated base film, coating said subcoated base film with a coating composition consisting of 20 parts by weight of chlorosulfonated polyethylene, 8 parts of litharge, 0.5 part of hydrogenated wood rosin, 0.2 part of mercaptobenzothiazole, 10 parts of an estersil comprised of a supercolloidal substrate having a surface of silica coated with —OR groups chemically bonded to the silica, R being a hydrocarbon radical of from 2 to 18 carbon atoms wherein the carbon atom attached to oxygen is also attached by hydrogen and 200 parts of carbon tetrachloride, drying the coated film and thereafter heating said coated film at a temperature of about 150° C., for from about 15–30 minutes to cure said chlorosulfonated polyethylene.

5. Balanced, biaxially oriented, heat-set polyethylene terephthalate base film having a continuous adherent coating comprising essentially from 40% to 90% by weight of chlorosulfonated polyethylene, from 5% to 60% by weight of uniformly distributed, finely divided particles of an estersil comprised of a supercolloidal substrate having a surface of silica coated with —OR groups chemically bonded to the silica, R being a hydrocarbon radical of from 2 to 18 carbon atoms wherein the carbon atom attached to oxygen is also attached by hydrogen, and from 2 to 60 parts by weight of a polyvalent metal oxide per 100 parts by weight of said chlorosulfonated polyethylene.

6. The process which comprises coating a balanced, biaxially oriented, heat-set polyethylene terephthalate base film with a coating composition comprising essentially an organic solvent having from 40% to 90% by weight, based on the weight of total solids in said coating composition, of chlorosulfonated polyethylene dissolved therein, and from 5% to 60% by weight of dispersed finely divided particles of an estersil comprised of a supercolloidal substrate having a surface of silica coated with —OR groups chemically bonded to the silica, R being a hydrocarbon radical of from 2 to 18 carbon atoms wherein the carbon atom attached to oxygen is also attached by hydrogen, and from 2 to 60 parts by weight of polyvalent metal oxide per 100 parts of said chlorosulfonated polyethylene, drying the coated film and thereafter heating said coated film to cure said chlorosulfonated polyethylene.

References Cited in the file of this patent

UNITED STATES PATENTS

| | | |
|---|---|---|
| 2,639,998 | Pavlic | May 26, 1953 |
| 2,657,149 | Iler | Oct. 27, 1953 |
| 2,676,121 | Chapman | Apr. 20, 1954 |
| 2,678,285 | Welwyn | May 11, 1954 |

OTHER REFERENCES

DuPont-Information Bulletin, "Hypalon" S–2 #–32, Aug. 8, 1952, page 14.

U. S. DEPARTMENT OF COMMERCE
PATENT OFFICE

CERTIFICATE OF CORRECTION

Patent No. 2,808,347                                          October 1, 1957

Philip Strubing Blatz

It is hereby certified that error appears in the printed specification of the above numbered patent requiring correction and that the said Letters Patent should read as corrected below.

Column 7, line 6, after "tetrachloride", and before the comma, insert -- to form a continuous coating on the film --.

Signed and sealed this 15th day of April 1958.

(SEAL)

Attest:
KARL H. AXLINE
Attesting Officer

ROBERT C. WATSON
                                                                             Commissioner of Patents